United States Patent
Vervaet et al.

(10) Patent No.: US 10,131,191 B2
(45) Date of Patent: Nov. 20, 2018

(54) TIRE PRESSURE REGULATION SYSTEM FOR A VEHICLE AND METHOD FOR SUCH A SYSTEM

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: Patrick Vervaet, Clermont-Ferrand (FR); Istvan Matyas, Clermont-Ferrand (FR); Denis Lhospitalier, Clermont-Ferrand (FR)

(73) Assignee: COMPAGNIE GENERALE DES ESTABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 15/524,933

(22) PCT Filed: Oct. 27, 2015

(86) PCT No.: PCT/EP2015/074866
§ 371 (c)(1),
(2) Date: May 5, 2017

(87) PCT Pub. No.: WO2016/071158
PCT Pub. Date: May 12, 2016

(65) Prior Publication Data
US 2017/0334252 A1    Nov. 23, 2017

(30) Foreign Application Priority Data

Nov. 7, 2014   (FR) ..................... 14 60776

(51) Int. Cl.
B60C 23/02   (2006.01)
B60C 23/00   (2006.01)
B60C 23/10   (2006.01)

(52) U.S. Cl.
CPC ............ B60C 23/002 (2013.01); B60C 23/10 (2013.01)

(58) Field of Classification Search
None
See application file for complete search history.

(56) References Cited

U.S. PATENT DOCUMENTS

| 6,144,995 | A  | 11/2000 | Maya et al. |
| 6,212,464 | B1 | 4/2001  | Skotnikov |
| 6,236,923 | B1 | 5/2001  | Corcoran et al. |

(Continued)

FOREIGN PATENT DOCUMENTS

| FR | 2 643 313    | 8/1990 |
| WO | WO 00/34060  | 6/2000 |
| WO | WO 2013/025898 | 2/2013 |

*Primary Examiner* — Andre J Allen
(74) *Attorney, Agent, or Firm* — Cozen O'Connor

(57) ABSTRACT

Tire pressure regulation method and system for an agricultural vehicle equipped with tires. In order to improve the pressure management of the tires connected to the tire pressure regulation system, a pressure setpoint is determined by determining the characteristics of the tires, the pressure of which is intended to be regulated by the tire pressure regulation device, determining the speed of the vehicle, calculating the pressure setpoint of the tire depending on the characteristics of the tire and on the speed.

16 Claims, 1 Drawing Sheet

(56) References Cited

U.S. PATENT DOCUMENTS

2015/0283866 A1* 10/2015 Dieckmann ........... B60C 23/003
          701/36
2018/0072116 A1* 3/2018 Notomi ............... B60C 23/0408

* cited by examiner

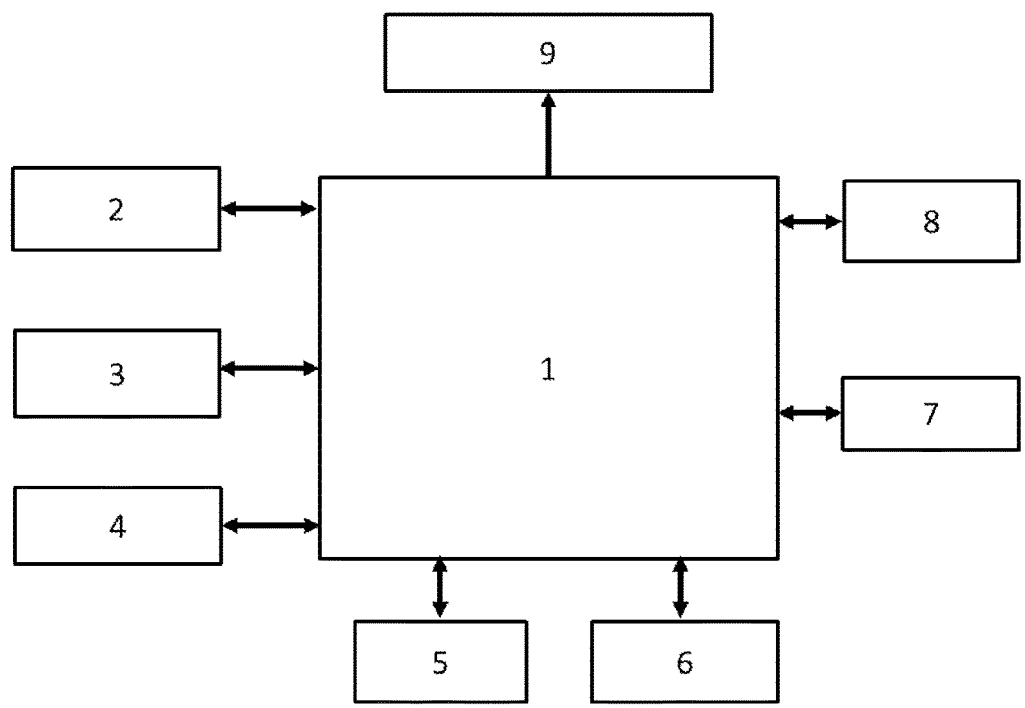

TIRE PRESSURE REGULATION SYSTEM FOR A VEHICLE AND METHOD FOR SUCH A SYSTEM

RELATED APPLICATIONS

This is a U.S. National Phase Application under 35 USC 371 of International Application PCT/EP2015/074866 filed on Oct. 27, 2015.

This application claims the priority of French application no. 1460776 filed Nov. 7, 2014, the entire content of which is hereby incorporated by reference.

FIELD OF THE INVENTION

The present invention relates to a tire pressure regulation system for a vehicle intended to be driven on different types of ground, such as an agricultural, forestry or civil engineering vehicle. It also relates to a method for determining the setpoint for a tire pressure regulation device. It is described more particularly for an agricultural vehicle but is applicable to any type of vehicle fitted with tires.

BACKGROUND OF THE INVENTION

A tire pressure regulation system aims to improve the performance of such vehicles depending on the characteristics of the surface on which they move, called the running surface. Optimized performance varies according to the user's real-time need, for example energy consumption, traction capacity, no impact on the running surface, speed of the vehicle, dynamic behaviour of the vehicle.

An agricultural vehicle is understood to mean any motorized machine used in agricultural work, such as, but not limited to, tractors, seeders, combine harvesters, spreaders, forage harvesters, sprayers and any assembly of these vehicles with a tool, such as, but not limited to, forks, packers, scythes, swing ploughs, ploughs, harrows, disc harrow, spreader, mulcher, plant lifter, planter or trailer, provided that there is at least one tire on said vehicle.

The pressure of the tires of the vehicle affects in particular its performance in terms of traction, grip, stability and consumption.

For example, the contact patch of the tire and therefore the number of tread blocks in contact with the ground depends on the pressure, this conditioning the performance of the vehicle in terms of traction.

The pressure also influences the rigidity of the tire and therefore the dynamic behaviour of the vehicle and therefore its stability.

This rigidity depends on the following tire design parameters:
  number of layers of the carcass reinforcement and of the crown reinforcement, mechanical characteristics of the respective constituent materials thereof,
  volumes and mechanical characteristics of the elastomeric materials constituting the tread and the other parts of the tire,
  characteristics of the tread, volumetric void ratio, shape and arrangement of the tread blocks etc.

The stiffness of a tire depending on the pressure can be measured when running on specific machines. These characteristics are also used to understand or even avoid problems of dynamic resonance on vehicles.

The pressure also influences the rolling resistance of the tire to an increasing extent, the greater the deformations of the tire when running are. Rolling resistance is a parameter that affects the fuel consumption of the vehicle.

Furthermore, for a given running surface, and for a given pressure range in the tire, the stiffer the tire, the lower the rolling resistance. However, such a property only holds as long as the contact force between the ground and the tire makes it possible to transmit the torque necessary to the vehicle in order to move forwards. The maximum contact force depends on the size of the contact patch, the contact pressure and the coefficient of friction between the materials in contact. If the torque force of the vehicle exceeds the maximum contact force, the tire slips and the corresponding energy is lost by friction. There is thus a pressure zone above which the rolling resistance increases with the tire pressure.

Moreover, by deforming under the action of the tire, loose ground generates a loss of energy, called resistance to forward movement of the ground. The higher the tire pressure, the higher the local pressure in the contact patch, and the greater the resistance to forward movement of the ground. Loose ground means ground, the deformation of which as the tire passes over it is of an order of magnitude comparable to the deflection of the vehicle, the deflection being the maximum radial deformation of the vehicle expressed in units of length. By definition, agricultural vehicles work partly on loose ground.

Depending on these three components of the total resistance to forward movement, rolling resistance, resistance to forward movement of the ground and slip, there is therefore an optimum tire pressure which makes it possible to minimize the consumption of the vehicle depending on the characteristics of the ground (grip, stiffness, temperature) and characteristics of the tire (grip, stiffness).

On the other hand, in particular for economic reasons linked to labour costs, to the locking up of financial capital represented by a machine compared to the energy costs, legal data on the weekly working time, or for any other reason, the user of the vehicle may wish not to optimize the performance of his vehicle in terms of energy consumption but depending on a criterion that links the energy consumption and the duration of the task to be accomplished. In such a case, the optimum speed of the vehicle will be determined via a calculation also including the parameters of the tire.

In addition, the properties of the running surface change under the pressure applied. Under the pressure of the tire, the local density of the running surface increases, making the ground less friable, less permeable and therefore less suitable for certain agricultural work, notably ploughing, and less suitable for plant growth. This well-known phenomenon is called soil compaction. To avoid the negative effects of soil compaction, it is necessary to limit the tire pressure depending on the type of work carried out and therefore the tool used.

To improve the functioning of agricultural or forestry vehicles, the latter have been equipped with tire pressure regulation systems which allow the user to choose, from the vehicle, a service pressure. In addition, since tire pressure is a determining factor for the efficiency of agricultural operations, the European Technical Rim and Tire Organization (ETRTO) standards define several curves that give the maximum load and the recommended pressure depending on the speed of the vehicle. Specifically, some agricultural tires can operate at pressures below 1 bar, while other tires of the same size operate above 1.6 bar. These differences in operating points are, moreover, the source of the creation of standards for overload indices (ETRTO standards: IF or VF). Given the multiplicity of parameters involved in determining the overall optimum tire pressure, the user's knowledge is insufficient. This is why there are many inventions in the prior art that are dedicated to finding this optimum.

Moreover, during the same agricultural work, the optimum tire pressures, for a set of selected performances, vary depending on the external conditions. These variations include variations in weather conditions, but also the characteristics of the vehicle or associated tool that change during work, for instance the mass of a spreading tool or a harvesting trailer, which become lighter and heavier, respectively, during work. This is why tire pressure regulation must deliver a pressure setpoint recalculated depending on these parameter changes.

The document U.S. Pat. No. 6,212,464 presents notably the control of the tire pressure by finding a slip rate of between 10 and 12%. The slip rate is calculated using the difference between the actual speed measured by satellite geolocation and that measured by the vehicle depending on the number of rotations of the wheel.

The document U.S. Pat. No. 6,144,995 proposes regulation of the vehicle tire pressure depending on the load of the vehicle.

The document WO2013/025898 describes an invention defining the vehicle tire pressure notably depending on its geolocation and the nature of the ground. The pressure is taken from a database that takes into account this geolocation and a number properties of the running surface that are measured by sensors positioned on the vehicle.

However, none of the systems described in these various documents takes into account the characteristics of the tires as parameters for regulating the pressure thereof, thereby making it impossible to determine the overall optimum of operation of the vehicle, but only a set of parameters that perform better than a set of parameters fixed a priori.

SUMMARY OF THE INVENTION

One object of the invention is to improve the tire pressure regulation of agricultural vehicles in real time, that is to say during the use of the vehicle.

This object is achieved in accordance with one aspect of the invention directed to a tire pressure regulation system for an agricultural vehicle equipped with tires, comprising:
at least one device for regulating the pressure of a tire,
means for determining a pressure setpoint for the tire pressure regulation device,
means for determining the characteristics of a tire, the pressure of which is intended to be regulated by the tire pressure regulation device,
means for determining the speed of the vehicle,
means for calculating the pressure setpoint of said tire depending on the characteristics of said tire and on the speed, which are determined in the preceding steps.

The means for determining the characteristics of a tire comprise means for reading an identifier of the tire and means for associating this identifier with the characteristics of the tire that are recorded in a database.

In the remainder of the description, the expressions "pressure regulator" and "tire pressure regulation device" are used interchangeably to designate the same item. The tire pressure regulation system has at least means for determining a pressure setpoint to be delivered for a pressure regulator. In its simplest embodiment, the pressure of the tires depends on the value delivered by the pressure regulator without the actual pressure in the tires being measured. In a system which is more complex but also better ensures the regulation of the tire pressure to its optimum value, the system is provided with at least one pressure sensor, installed either at each of the tires or at the pipes for the supply of inflating gas to the tires. This sensor returns this information to the regulator, which comprises means for comparing the value given by the setpoint and the actual value and for adapting the value of the delivered pressure. This type of looping makes it possible in particular to take into account the phenomena of variation in the pressure depending on the temperature of the inflation gas, which may vary either on account of the use of the tire or depending on the outside temperature.

The tire pressure regulation system delivers at least one setpoint for the inflation of at least one tire of the vehicle. In its optimal version, it delivers an appropriate setpoint for each tire of the vehicle, tire of the self-propelled machine and of the tool or associated trailer, if necessary. The operation of the agricultural machine is optimal if the pressures of all its tires are optimized. This means that the tire pressure regulation system takes account in particular of the position of the tire on the vehicle. In the position of the tire, we mean any information useful for evaluating the setpoint. Specifically, the position of the tire on the vehicle implies several characteristics, for example:
those related to the axle on which the tire is mounted, such as its function, for example driving, carrying, steering, which implies different expected performances and therefore different pressure optima, or such as its position on the vehicle, for example front, rear, or the axle number for multi-axle vehicles, which are subjected to different load transfers,
those related to the lateral position of the tire with respect to the vehicle, which influences any pressure compensation linked to the cant of the running surface,
those related to the position of the tire in the case of multiple mounting, since, given the deformation of the axle or the cant of the running surface, the load applied is different if the tire occupies the inner, outer or an intermediate position in the case where the multiple mounting comprises more than two tires. Multiple mounting is understood to mean the fitting of several tires at one end of an axle.

The characteristics of the tire or tires of the vehicle are given by the manufacturer of said tires. These characteristics are, for example, the dimensions, the stiffnesses of the tire, its possible overload index, its rolling resistance, its grip depending on the speed, the position of the tire on the vehicle, the pressure, the type of ground, the load applied, or any other performance of the tires depending on all the parameters of use.

The speed of the vehicle can be determined by any means, in particular by geolocation, by the vehicle depending on the number of rotations of the wheel, by a wave system, radar, Doppler sensor.

The calculation of the setpoint is carried out via any known calculation system, such as chart, modelling, neural network.

The characteristics of the tire, the pressure of which is intended to be regulated by the tire pressure regulating system, are determined by entering an identifier of the tire into a database. This identifier is given by the manufacturer of the tire or that of the tire pressure regulating system by means of an information carrier, outside, in or on the tire. The identifier can either be entered by the user or be read by a laser via a barcode or by an optical sensor via a matrix barcode known as the QR code, or via a radio-frequency identification (RFID) chip placed in the tire with an associated reader, or else by a near field communication (NFC) type communication device, which itself can be mobile or close to the tires for continuous reading, namely near the wheel arches. The reader of the identifier transmits to the system preferably using wireless data transmission technology. The database is located either in the vehicle or outside the vehicle and, in the latter case, is accessible by any means of remote communication such as, for example, radio waves or a WiFi system. The database contains all or some of the data for improving the tire pressure regulation setpoint, for example the dimensions of the tires, the "load, pressure, and speed" charts, and the grip characteristics depending on the ground.

In order to guarantee the accuracy of the information given to the tire pressure regulation system given that the tires are an element of vehicle safety, it is preferable for the means for identifying the tire to be inseparable from the latter. Inseparable is understood to mean that it is not possible to separate the tire from its identifier without removing material down to a depth greater than 0.5 mm from the external surface of the tire. The identifier of the tire can be read systematically upon each determination of the setpoint or recorded by the system as long as the system is switched on or the setpoint does not pass through zero.

This invention makes it possible to determine the overall optimum of operation of the vehicle, by controlling the tire pressure regulation, taking into account the intrinsic characteristics of the tire.

Advantageously, the means for determining a pressure setpoint for the tire pressure regulation system further comprise means for determining at least one characteristic of the running surface. This determination can be made either through the user's choice of a predetermined type of ground such as road, track, loose ground, or by any type of sensor for determining the desired characteristic, such as, for example, its rigidity, its compactness, its moisture content, its temperature, its cant, the mechanical capacity of the soil to resist compaction. The rigidity of the ground affects the surface of the contact patch and thus, among other things, rolling resistance and grip. The user may wish not to exceed the existing ground compactness and a measurement of this characteristic may give a value of the maximum permissible pressure. This compactness is measurable with a penetrometer probe. Moisture influences grip. The cant influences the load transfers which the various tires of the vehicle are subjected to and the knowledge thereof makes it possible to determine the optimum pressures of the various tires of the vehicle.

It is particularly advantageous that the means for determining a pressure setpoint for the tire pressure regulation device further comprise means for recording at least one setpoint of the driver. In addition to the nature of the ground which can be indicated by the driver, the setpoints entered by the user may include, non-exclusively, the tools pulled or carried by the vehicle, the type of criterion for improving the pressure setpoint, for example energy saving, task duration, maximum ground compaction, comfort, working speed or any compromise between these performances that can be expressed by a function of the latter. The setpoint will preferably be expressed in the professional terminology of the user.

The type of tool used is also useful for improving the setpoint of the tire pressure: for example work carried out with a plough requires a high torque load, work carried out with a seeder requiring essentially respect for the ground with moderate torque, work carried out with a trailer involving a load capacity, speed and good behaviour. It is therefore also advantageous for the means for determining a pressure setpoint for the tire pressure regulation device to comprise means for determining the characteristics of a tool installed on said vehicle. If said tool is provided with a tire, the pressure thereof can also be regulated by means of the invention.

The means for determining the pressure setpoint of a tire pressure regulation system according to the invention also advantageously comprise means for determining the load applied to the tire since the load is an optimum pressure determination parameter recommended by tire manufacturers. It is in a direct relationship with the deflection and the decrease in size of the contact patch. It affects the rolling resistance, the grip and the endurance of the tires. This determination is, in the most advantageous case, provided for each tire regulated by the tire pressure regulation system by means of a force sensor or of an evaluation of the load depending on the deformations of the tire, such as, for example, deflection, counter-deflection, deradialization of the sidewalls. This type of evaluation is particularly advantageous when using a high-transfer or load-changing agricultural machine, such as seeders, the load of which decreases as the work is carried out, trailers which are loaded as the work is carried out, packers, which undergo a cycle of loading and unloading while the work is being carried out. In a less optimal application, the load can be measured for each axle or supplied to the system by the user.

A preferred embodiment is such that the means for determining a pressure setpoint of the tire pressure regulation system comprise the means for determining the rate of slip of the tire on the running surface. To the extent that the energy consumption of the vehicle is the sum of the energy dissipated by rolling resistance, resistance to forward movement of the ground and slip, knowledge of the slip rate is one of the parameters for calculating the optimum pressure in order to minimize energy consumption. It may be advantageous to reduce the pressure and the speed in order to decrease the resistance to forward movement of ground that exhibits much too little grip. The energy thus saved compensates for the increase in rolling resistance. The slip rate can be estimated by comparing the theoretical speed given by the speed of rotation of the wheels and the actual speed, which can be estimated by radar, GPS, Doppler effect.

Advantageously, the tire pressure regulation system is such that the means for determining the characteristics of a tool pulled or carried by the vehicle comprise means for reading an identifier of a tool installed on said vehicle and means for associating this identifier with the characteristics of the tool. This identifier is given by the manufacturer of the tool or that of the tire pressure regulation system by means of an information carrier, outside, in or on the tool. The identifier can either be entered as a parameter into the system by the user or be read by a laser via a barcode or by an optical sensor via a matrix barcode known as the QR code, or via a radio-frequency identification (RFID) chip placed in the tool with an associated reader, or be transmitted via a bus of the CAN type that makes it possible to transmit data between the tool and the vehicle or else by a near field communication (NFC) type communication device. The means for reading the identifier of the tool may be of the same type as those of the tire in order to avoid the multiplication of the means for recording the parameters of the system.

It is particularly advantageous for the means for determining a pressure setpoint of the tire pressure regulation system to comprise the means for taking into account the inflation parameters recommended by the manufacturer of the vehicle. Some agricultural vehicles are equipped with axles for mounting multiple tires. Depending on the distance of the tire from the axis of the axle, the manufacturer recommends a different pressure in order to optimize the deformation of the axle. The value of the recommended setpoint also depends on the position of a tool, depending on whether it is in a transporting or working position, such as for harrows, ploughs, spreaders.

Another aspect of the invention is directed to a method for determining a setpoint for a device for regulating the pressure of a tire, comprising
   a step of determining the characteristics of a tire, the pressure of which is intended to be regulated by the tire pressure regulation device,
   a step of determining the speed of the vehicle,
   a step of calculating the pressure setpoint of said tire depending on the characteristics of said tire and on the speed,
   a step of reading an identifier of the tire and a step of associating this identifier with the characteristics of the tire in a database.

It is advantageous for the method to comprise a step of determining at least one characteristic of the running surface when determining the inflation pressure setpoint of the tires.

Also advantageously, the method comprises a step of recording at least one setpoint of the driver in order to enable him to choose at least the type of optimization that he desires:
   relating to the compaction of the soil during the task
   relating to the energy consumption required to carry out the task
   relating to the duration of task completion
   relating to an optimum of one of these parameters with others being limited; for example the lowest energy consumption for a pressure not exceeding 1 bar.
This step makes it possible to take into account the needs of the driver not integrated a priori into the method for calculating the pressure setpoint of the tire pressure regulation system.

An advantageous solution is that the method for determining a pressure setpoint for a device for regulating the pressure of a tire comprises a step of determining the characteristics of a tool installed on the vehicle in order to adapt the pressure setpoints to the type of work of the tool and its specific technical data.

It is particularly advantageous for the method for determining a pressure setpoint for a device for regulating the pressure of a tire to comprise a step of determining the load applied to the tire.

Advantageously, the method for determining a pressure setpoint for a device for regulating the pressure of a tire comprises a step of determining the rate of slip of the tire on the running surface.

A preferred solution is that the method for determining a pressure setpoint for a device for regulating the pressure of a tire comprises a step of reading an identifier of a tool installed on said vehicle and of associating this identifier with the characteristics of the tool.

It is particularly advantageous for the method for determining a pressure setpoint for a device for regulating the pressure of a tire to comprise a step of taking into account the inflation parameters recommended by the manufacturer of the vehicle.

BRIEF DESCRIPTION OF THE SINGLE DRAWING

The features and other advantages of the invention will be understood better with the aid of FIG. 1, which shows the input data and the output setpoints of the computer 1 of the tire pressure regulation system.

DETAILED DESCRIPTION OF THE SINGLE DRAWING

The tires are identified and their identifiers 2 are recorded by the computer. The latter interrogates the tire database 3, either located remotely and interrogated by a wireless communication means, or internal to the computer. The tire identifiers can also be entered by the user. In response to the request, the tire database transmits to the computer the characteristics of the tires, required for calculation.

The tools used are identified and their identifiers 4 are recorded by the computer. The latter interrogates the tool database 5, either located remotely and interrogated by a wireless communication means, or internal to the computer. The tool database transmits to the latter the characteristics of the tools, required for the calculation. The tool can also be entered as a type of work tool by the user from a limited range.

Use data 6 such as axle load, speed, slip, torque, tool position and characteristics of the running surface 7 are recorded by the computer either after being measured by the suitable on-board sensors, or by a driver evaluation. The speed is either measured via the vehicle speedometer or via an evaluation based on the geolocation (GPS), or entered as a user's average setpoint from a small number of choices such as, for example, "road running", "track running", "working loose ground". The characteristics of the ground are either measured via suitable on-board sensors or entered as a user's average setpoint, such as asphalt, compacted soil, loose ground. The user enters the desired type of performance compromise 8 such as, for example:
   no compaction of the ground during the task
   lowest energy consumption required to perform the task
   shortest duration of task completion
   optimum of one of these parameters with the others being limited; for example the lowest energy consumption for a pressure not exceeding 1 bar.

On the basis of these data, the computer delivers pressure setpoints 9 to the tire pressure regulation system for each tire incorporated into the system. The tire pressure regulation system delivers the pressure given by the setpoints. This setpoint changes with each change of the system, i.e. tires, tools, parameters of use, for example of the type of ground, the speed, the optimum desired, the position of the tool.

The invention was realized on a 250 hp tractor hitched to a plough for ploughing 10-hectare plots located on relatively flat ground of the clay type. Ploughing is preceded by a 10 km approach drive and a likewise 10 km return to the farm, this drive being done at a speed of 40 km/h. The load of the vehicle is 12000 kg. The tractive forces to be transmitted to the plough during this work is 6000 daN. The tires fitted to the vehicle are tires of the size 600/65R28 at the front and of size 710/70 R38 at the rear. According to the manufacturers, these tires can be used at a pressure of between 0.4 and 2.4 bar.

In the experiment according to the invention, the driver reads a radio-frequency identification (RFID) chip fitted during the production of the tire using a suitable reader. The processor records the identifier and downloads the tire data from a dedicated site, including the load and pressure curve for a pressure between 0.4 and 2.4 bar. It then calculates, in real time, the instantaneous optimum pressure and activates the pressure regulation system accordingly.

With respect to a constant pressure cycle of 1.4 bar, the invention, by continuously controlling the pressure between the limits of 0.4 and 2.4 bar fixed by the capacities of the tires, makes it possible to reduce the consumption by around 10% and/or allows an additional potentially available power to maintain the speed if hills are crossed.

In the field working part, a 5% productivity gain (in hectares worked per hour) is obtained and also a reduction in consumption of 15% by reduction of ground deformation and slip between the ground and the tire. Decreases in ground compaction of around 50%, measured by a penetrometer probe with a 1.25 cm tip, are obtained and can be seen through the improvement in agronomic yield.

The experiment according to the prior art with optimization of the slip rate of 12% without taking account of the tire data, which is a possible criterion for optimizing the use of an agricultural vehicle recommended by the prior art, is inapplicable on the road part of the cycle.

Compared to a pre-configured system where running is carried out at a pressure equal to 1.6 bar on the road and 0.8 bar in the field in order to integrate the entire tire supply on the market, the tire pressure regulation system according to the invention, which uses the entire range of pressures authorized by the manufacturer of the identified tire, allows a reduction in energy consumption of around 5% and a reduction in ground compaction of around 30%.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. Tire pressure regulation system for an agricultural vehicle equipped with tires, comprising:
    at least one device for regulating the pressure of a tire, and
    means for determining a pressure setpoint for the tire pressure regulation device,
    wherein the means for determining a pressure setpoint comprise:
        means for determining the characteristics of the tire, the pressure of which is to be regulated by the tire pressure regulation device,
        means for determining the speed of the vehicle,
        means for calculating the pressure setpoint of said tire depending on the characteristics of said tire and on the speed,
        the means for determining the characteristics of a tire comprising means for reading an identifier of the tire and means for associating this identifier with the characteristics of the tire that are recorded in a database.

2. The tire pressure regulation system according to claim 1, wherein the means for determining a pressure setpoint for the tire pressure regulation device further comprise means for determining at least one characteristic of the running surface.

3. The tire pressure regulation system according to claim 1, wherein the means for determining a pressure setpoint for the tire pressure regulation device further comprise means for recording at least one setpoint of a driver of the vehicle.

4. The tire pressure regulation system according to claim 1, wherein the means for determining a pressure setpoint for the tire pressure regulation device further comprise means for determining the characteristics of a tool installed on said vehicle.

5. The tire pressure regulation system according to claim 1, wherein the means for determining a pressure setpoint for the tire pressure regulation device further comprise means for determining the load applied to the tire.

6. The tire pressure regulation system according to claim 1, wherein the means for determining a pressure set point for the tire pressure regulation device further comprise means for determining the rate of slip of the tire on the running surface.

7. The tire pressure regulation system according to claim 4, wherein the means for determining the characteristics of a tool comprise means for reading an identifier of a tool installed on said vehicle and means for associating this identifier with the characteristics of the tool.

8. The tire pressure regulation system according to claim 1, wherein the means for determining a pressure setpoint for the tire pressure regulation device further comprise means for taking into account the inflation parameters recommended by the manufacturer of the vehicle.

9. Method for regulating the pressure of a tire using a tire pressure regulation device, comprising:
    determining the characteristics of the tire, the pressure of which is to be regulated by the tire pressure regulation device, by reading an identifier of the tire and associating this identifier with tire characteristics stored in a database,
    determining the speed of a vehicle on which the tire is mounted,
    calculating a pressure setpoint of said tire depending on the determined characteristics of said tire and the determined vehicle speed, and
    controlling, by the tire pressure regulation device, pressure in the tire based on the calculated pressure setpoint of said tire.

10. The method according to claim 9, comprising a step of determining at least one characteristic of the running surface.

11. The method according to claim 9, comprising a step of recording at least one setpoint of the driver.

12. The method according to claim 9, comprising a step of determining the characteristics of a tool installed on the vehicle.

13. The method according to claim 9, comprising a step of determining the load applied to the tire.

14. The method according to claim 9, comprising a step of determining the rate of slip of the tire on the running surface.

15. The method according to claim 9, comprising a step of reading an identifier of a tool installed on said vehicle and of associating this identifier with the characteristics of the tool.

16. The method according to claim 9, comprising a step of taking into account the inflation parameters recommended by the manufacturer of the vehicle.

* * * * *